(12) United States Patent
Szeto

(10) Patent No.: US 9,509,644 B2
(45) Date of Patent: *Nov. 29, 2016

(54) SYSTEM AND METHOD FOR SHARING CONTENT IN AN INSTANT MESSAGING APPLICATION

(71) Applicant: Google Inc., Mountain View, CA (US)

(72) Inventor: Christopher Szeto, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,536

(22) Filed: Sep. 30, 2015

(65) Prior Publication Data

US 2016/0080292 A1 Mar. 17, 2016

Related U.S. Application Data

(63) Continuation of application No. 12/480,622, filed on Jun. 8, 2009, now Pat. No. 9,165,284.

(60) Provisional application No. 61/059,694, filed on Jun. 6, 2008.

(51) Int. Cl.
| | |
|---|---|
| *G06Q 10/10* | (2012.01) |
| *H04L 12/58* | (2006.01) |
| *H04L 12/24* | (2006.01) |
| *G06F 3/0481* | (2013.01) |
| *G06F 3/0482* | (2013.01) |
| *G06F 3/0484* | (2013.01) |

(52) U.S. Cl.
CPC .......... *H04L 51/043* (2013.01); *G06F 3/0481* (2013.01); *G06F 3/0482* (2013.01); *G06F 3/04842* (2013.01); *G06Q 10/10* (2013.01); *H04L 12/2496* (2013.01); *H04L 12/581* (2013.01)

(58) Field of Classification Search
None
See application file for complete search history.

(56) References Cited

U.S. PATENT DOCUMENTS

| | | | |
|---|---|---|---|
| 5,721,763 A | 2/1998 | Joseph et al. | |
| 7,587,450 B2 | 9/2009 | Morris | |
| 7,853,881 B1 | 12/2010 | Aly Assal et al. | |
| 7,904,500 B1 | 3/2011 | Anderson | |
| 8,046,259 B1 | 10/2011 | Siegel et al. | |
| 8,219,134 B2 * | 7/2012 | Maharajh .......... | G06F 17/30035 455/3.01 |

(Continued)

FOREIGN PATENT DOCUMENTS

| | | |
|---|---|---|
| WO | WO 2008/005948 | 1/2008 |
| WO | WO 2009/149466 | 12/2009 |
| WO | WO 2009/149468 | 12/2009 |

OTHER PUBLICATIONS

Webpages downloaded from http://www.yoono.com/, printed on Sep. 10, 2009, 15 pages.

(Continued)

*Primary Examiner* — Angela Nguyen
(74) *Attorney, Agent, or Firm* — Patent Law Works LLP

(57) ABSTRACT

A method and system for sharing content in an instant messaging application are disclosed. According to one embodiment a computer-implemented method comprises logging content accessed by a first client, and a list of accessible content is updated and provided to the first client. A request is received from the first client to share first content of the list of accessible content with a second client, and a message is delivered to the second client, the message containing a link to the first content.

20 Claims, 8 Drawing Sheets

(56) References Cited

U.S. PATENT DOCUMENTS

| | | | |
|---|---|---|---|
| 2003/0001846 | A1 | 1/2003 | Davis et al. |
| 2003/0018747 | A1 | 1/2003 | Herland et al. |
| 2003/0195801 | A1 | 10/2003 | Takakura et al. |
| 2004/0215708 | A1 | 10/2004 | Higashi et al. |
| 2005/0086605 | A1 | 4/2005 | Ferrer et al. |
| 2005/0114204 | A1 | 5/2005 | Kim et al. |
| 2005/0131992 | A1 | 6/2005 | Goldstein et al. |
| 2005/0266835 | A1 | 12/2005 | Agrawal et al. |
| 2006/0074769 | A1 | 4/2006 | Looney et al. |
| 2006/0095530 | A1 | 5/2006 | Daniell et al. |
| 2006/0116139 | A1 | 6/2006 | Appelman |
| 2007/0006089 | A1 | 1/2007 | Bales et al. |
| 2007/0143439 | A1 | 6/2007 | Szabo et al. |
| 2007/0168490 | A1* | 7/2007 | Kent ................. G06F 17/30887 709/223 |
| 2007/0203593 | A1* | 8/2007 | Weng ............... G06F 17/30749 700/94 |
| 2007/0203917 | A1* | 8/2007 | Du ........................ H04L 12/582 |
| 2007/0220106 | A1 | 9/2007 | Reisman |
| 2007/0234226 | A1 | 10/2007 | Szeto |
| 2007/0282621 | A1 | 12/2007 | Altman et al. |
| 2008/0091517 | A1 | 4/2008 | Koonce et al. |
| 2008/0126484 | A1 | 5/2008 | Wherry et al. |
| 2009/0307082 | A1 | 12/2009 | Raghunathan et al. |
| 2009/0307089 | A1 | 12/2009 | Binnewies |
| 2010/0070899 | A1 | 3/2010 | Hunt et al. |

OTHER PUBLICATIONS

International Search Report of the International Searching Authority for Application No. PCT/US2007/072687, mailed on Jul. 29, 2008, 5 pages.
Written Opinion of the International Searching Authority for Application No. PCT/US2007/072687, mailed on Jul. 29, 2008, 3 pages.
International Preliminary Report on Patentability for Application No. PCT/US2007/072687, mailed on Jan. 15, 2009, 5 pages.
International Search Report of the International Searching Authority for Application No. PCT/US2009/046653, mailed on Jul. 21, 2009, 3 pages.
Written Opinion of the International Searching Authority for Application No. PCT/US2009/046653, mailed on Jul. 21, 2009, 4 pages.
International Search Report of the International Searching Authority for Application No. PCT/US2009/046663, mailed on Dec. 30, 2009, 2 pages.
Written Opinion of the International Searching Authority for Application No. PCT/US2009/046663, mailed on Dec. 30, 2009, 5 pages.
Preliminary Report on Patentability for Application No. PCT/US2009/046651, mailed on Dec. 6, 2010, 4 pages.
Preliminary Report on Patentability for Application No. PCT/US2009/046653, mailed on Dec. 6, 2010, 5 pages.
Preliminary Report on Patentability for Application No. PCT/US2009/046663, mailed on Dec. 6, 2010, 6 pages.
Non-Final Office Action for U.S. Appl. No. 11/772,745, mailed on Apr. 1, 2011, 19 pages.
IBM TDB, "Advertising System for Electronic Chat Environments," ip.com, Prior Art Database, Technical Disclosure, Original Publication Date Aug. 18, 2002, ip.com Electronic Publication Date Jun. 21, 2003, 7 pages.
Non-Final Office Action for U.S. Appl. No. 12/558,304, mailed on Aug. 19, 2011, 11 pages.
Non-Final Office Action for U.S. Appl. No. 12/480,643, mailed on Jul. 8, 2011, 13 pages.
Non-Final Office Action for U.S. Appl. No. 12/480,671, mailed on Jul. 20, 2011, 12 pages.
Final Office Action for U.S. Appl. No. 11/772,745, mailed on Oct. 3, 2011, 10 pages.
Final Office Action for U.S. Appl. No. 12/558,304, mailed Jan. 19, 2012, 14 pages.
Final Office Action for U.S. Appl. No. 12/480,643, mailed Jan. 23, 2012, 15 pages.
Advisory Action U.S. Appl. No. 12/480,671, mailed Feb. 16, 2012, 3 pages.
Final Office Action for U.S. Appl. No. 12/480,671, mailed Dec. 1, 2011, 17 pages.

* cited by examiner

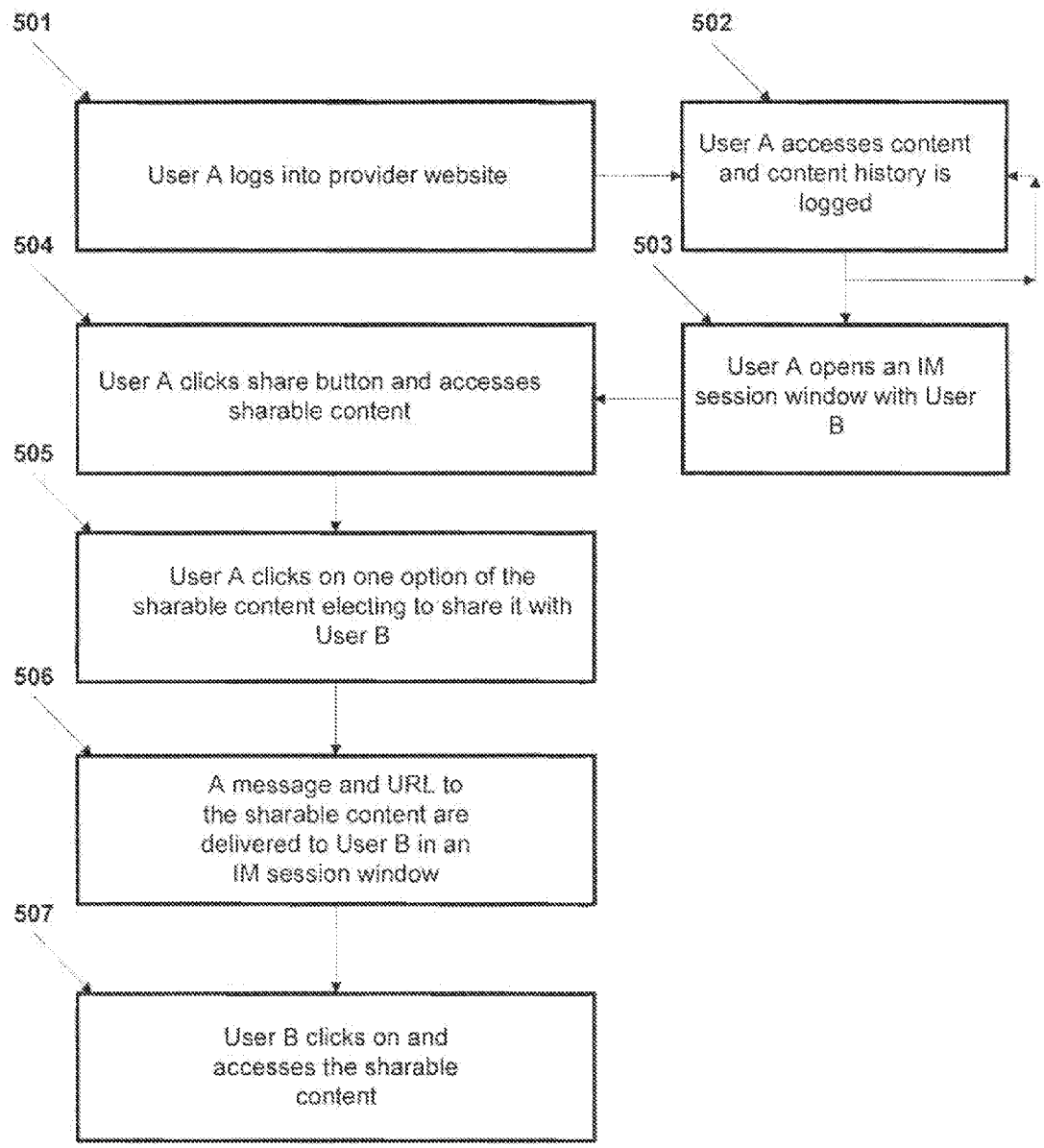

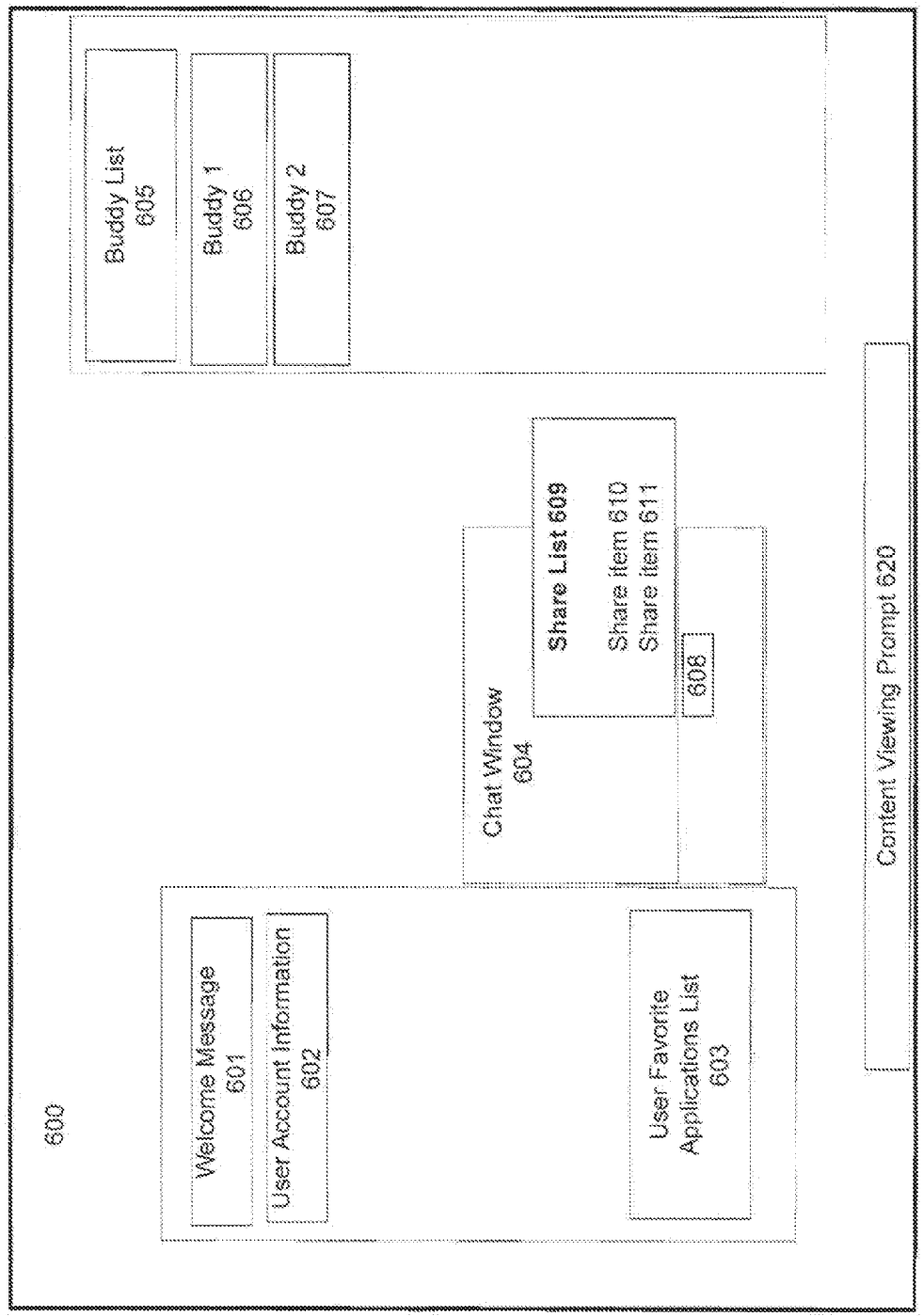

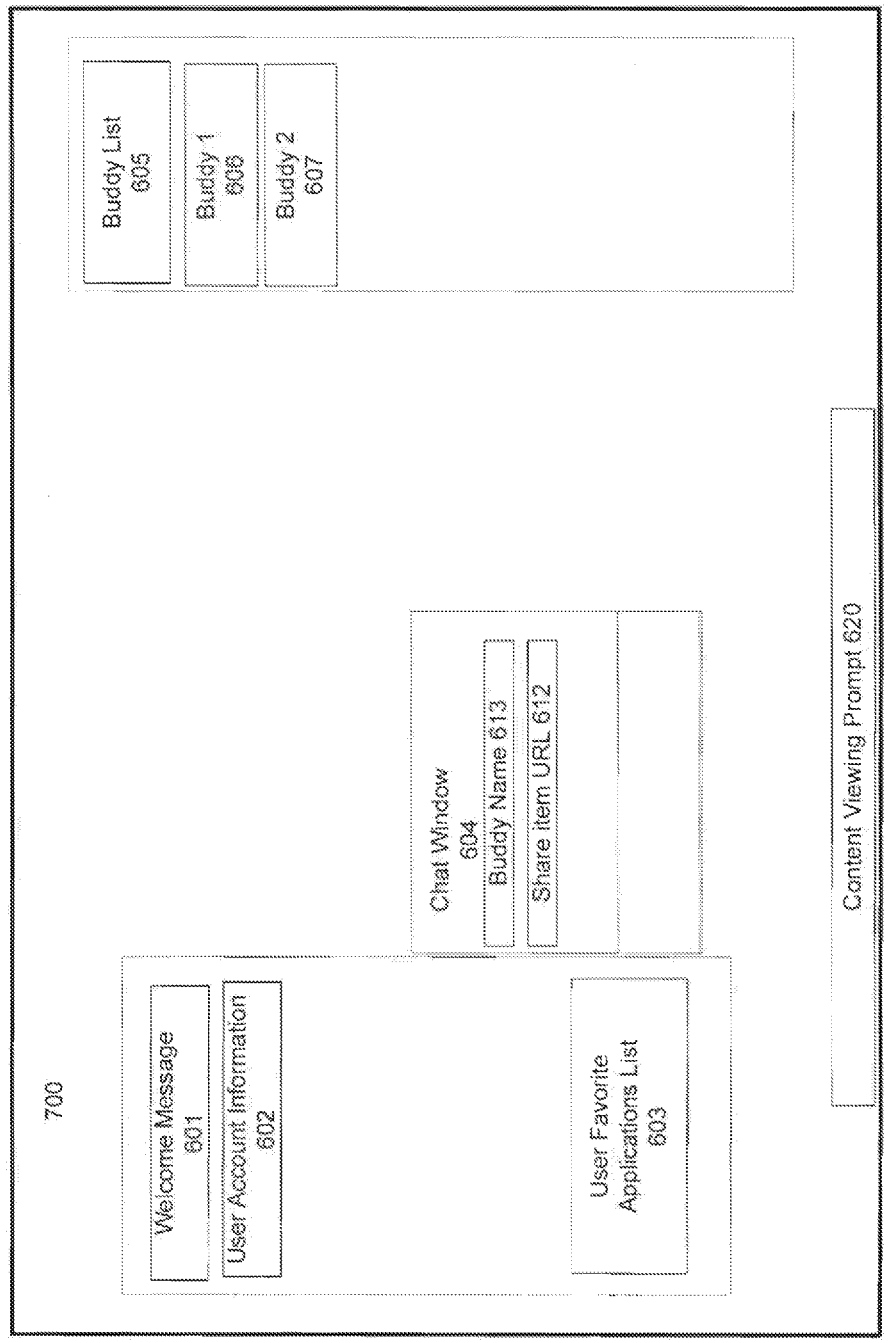

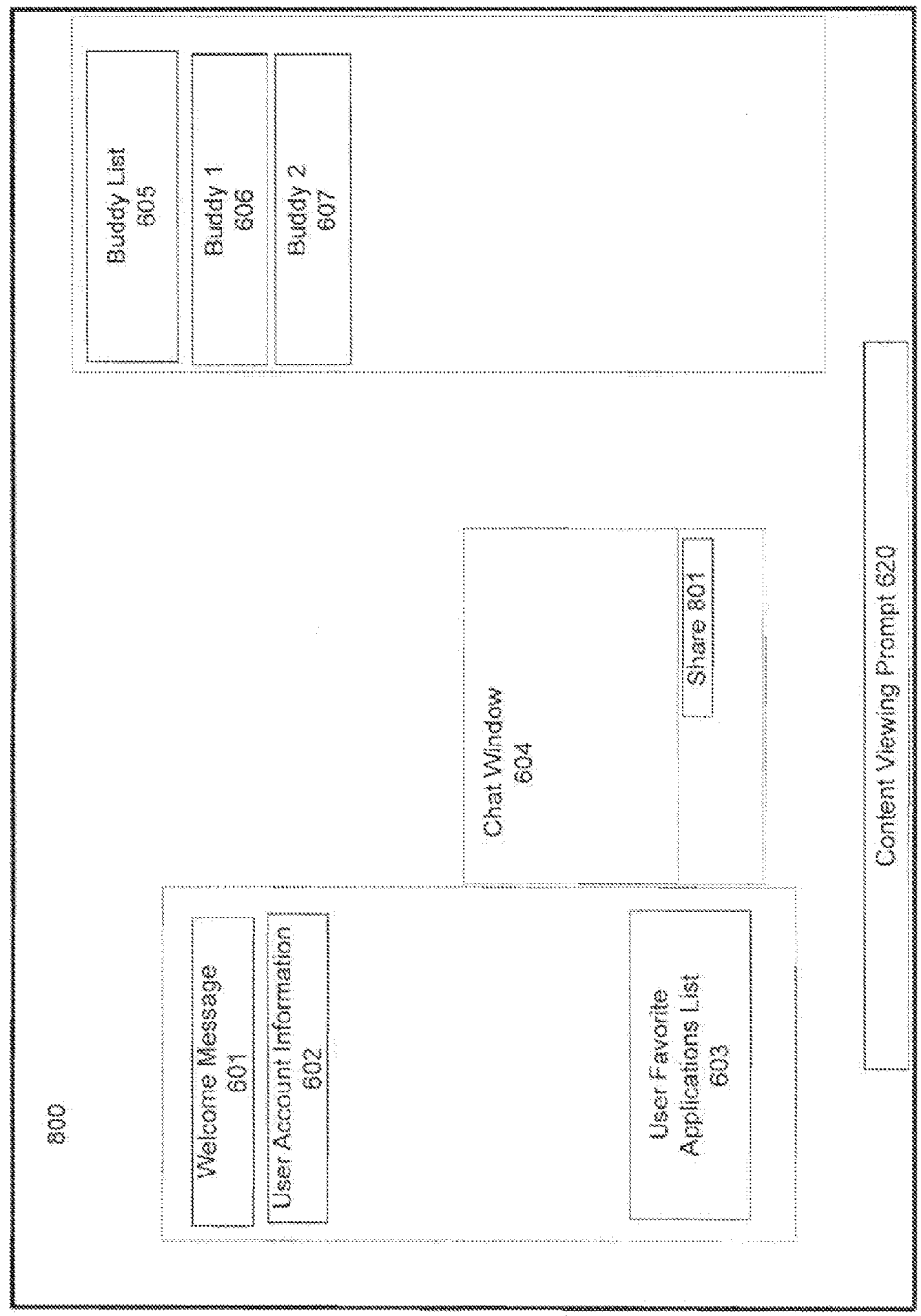

SYSTEM AND METHOD FOR SHARING CONTENT IN AN INSTANT MESSAGING APPLICATION

CROSS REFERENCE TO RELATED APPLICATIONS

This application is a continuation of and claims priority to U.S. application Ser. No. 12/480,622, filed Jun. 8, 2009, titled "System and Method for Sharing Content in an Instant Messaging Application," which claims priority under 35 U.S.C. §119, of U.S. Provisional Patent Application No. 61/059,694, filed Jun. 6, 2008, titled "System and Method for Sharing Content in an Instant Messaging Application," each of which is incorporated by reference in its entirety.

FIELD

The present invention relates generally to the field of computer applications and, more specifically, to sharing content in an instant messaging application.

BACKGROUND

Sharing content in an instant messaging application (IM) is often a cumbersome process because it either requires users to manually copy and paste content into IM windows to share, or it requires a user to choose from an enormous list of everyone they know.

IM users share content with each other by sending the URL to the content over IM. For example: if a user wanted to share a website or a YouTube video, the user copies the URL in the address bar of the browser and pastes it into an IM window and sends it to a friend. The friend clicks on the URL and then see the same content in his or her web browser. Relying on users manually copying and pasting what is often a lengthy URL is error prone as users do not always manage to "copy" the entire URL.

SUMMARY

A method and system for sharing content in an instant messaging application are disclosed. According to one embodiment a computer-implemented method comprises logging content accessed by a first user, updating a list of accessible content, displaying the list of accessible content to the first user, receiving a request by the first user to share first content of the list of accessible content with a second user, and delivering a message to the second user, the message containing a link to the first content.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 5 illustrates a flow diagram for sharing content within a system for sharing content in an instant messaging application, according to one embodiment.

FIG. 6 illustrates an exemplary user interface within a system for sharing content in an instant messaging application, according to one embodiment.

FIG. 7 illustrates an exemplary user interface within a system for sharing content in an instant messaging application, according to one embodiment.

FIG. 8 illustrates an exemplary user interface within a system for sharing content in an instant messaging application, according to one embodiment.

DETAILED DESCRIPTION

Figure 1:
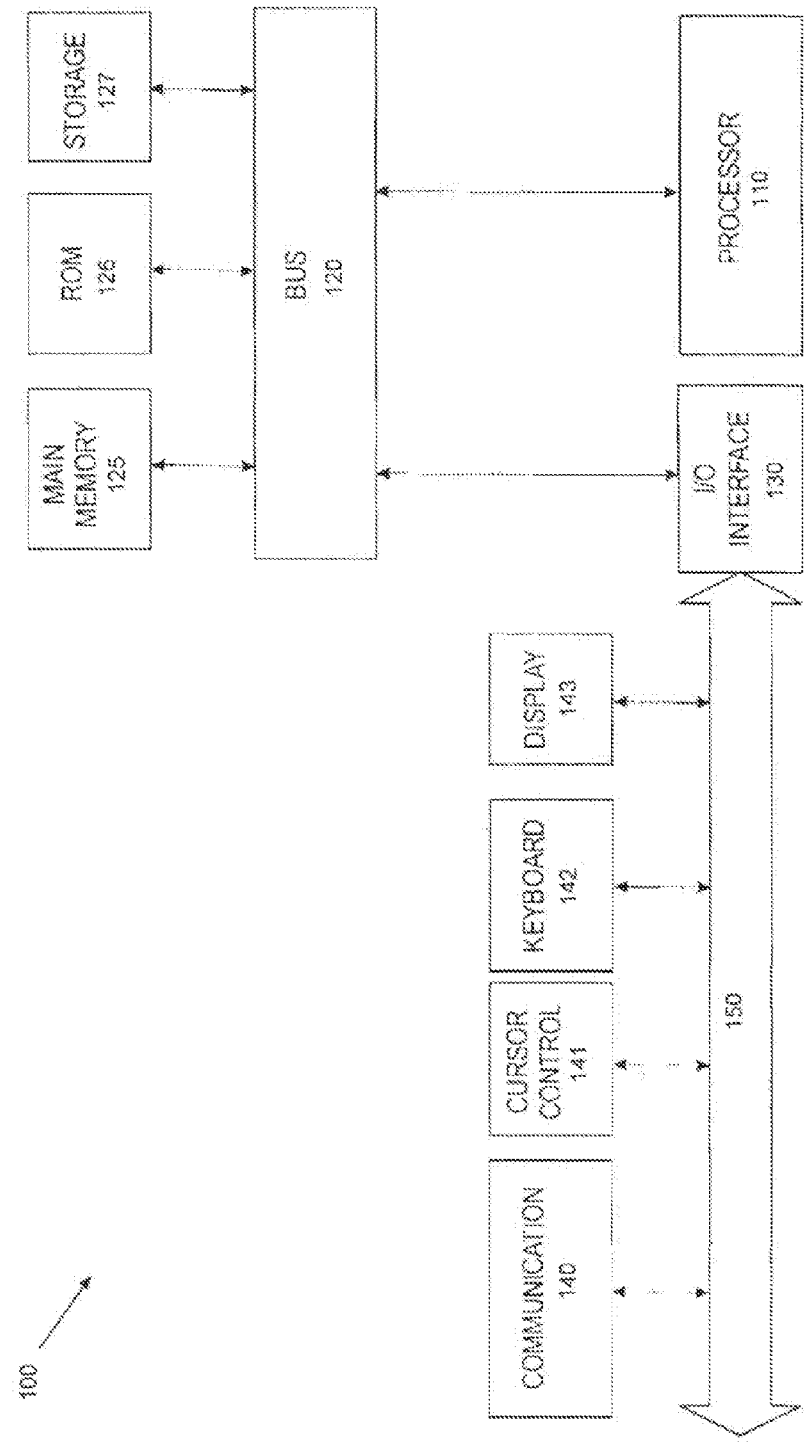
FIG. 1 illustrates an exemplary computer architecture for use with the present system, according to one embodiment.

A method and system for sharing content in an instant messaging application are disclosed. According to one embodiment a computer-implemented method comprises logging content accessed by a first user, updating a list of accessible content, displaying the list of accessible content to the first user, receiving a request by the first user to share first content of the list of accessible content with a second user, and delivering a message to the second user, the message containing a link to the first content.

The present system shares content in an instant messaging application. The present system automatically records a list of recently viewed content from within the IM application for a user and makes this list available in every IM window through a "share" button.

Every time the user views content that can be shared, the application stores the location of the content in a list of recently viewed content. According to one embodiment, the client sends a message to a server describing the content that was viewed so the server can store it.

Content includes but is not limited to a URL, an advertisement (ad), IM-specific content (example: an emoticon), rich media (example: a photo, a music file, a video, an application (example: a game).

The list may be stored on the server and associated with a user account so that a user can have access to the recently viewed content.

The list may be stored on the client, however the list can not be accessed from other computers (Le. library, internet café, work versus home) in this case.

In one embodiment, a server of the present system removes duplicates (if users share the same thing over and over).

In one embodiment, the system stores the last time users viewed the content (so that the system can sort the list in a relevant way).

In one embodiment, the system stores a fixed number of accessible previously accessed content, but may also store all viewed content permanently. A fixed number is used because seeing a large list or really old content may not be as useful or relevant.

When a user signs in to the IM application, the server returns the user's list of recently viewed content. Every IM window in the application has a share button that draws the list of recently viewed content.

When the user selects an item to share, a message containing the location of the content is sent to the friend corresponding to the IM window.

User customizable preferences include but are not limited to: clearing the history, specifying how many items to show in the history, specifying what types of content to store.

The system tracks certain metrics like the number of things shared, the types of content shared, if the content shared is actually viewed by a friend.

The present system puts the content that users view at user's fingertips by making it available in every IM window. There is no need to copy and paste a URL to share content with a friend over IM. Whenever users click on a URL or view some content that a friend IM's to the users, the present system remembers it and makes it available within a click from any IM window.

The present system makes it easier to share by creating an opportunity to share from the IM window which represents a conversation with a friend, rather than from the content itself. For example, the present system makes it possible to share the content when the user is not looking at the content. The user can share content that he or she has seen with any user. The user does not have to remember how to find the content.

The present system makes it easier to share content with the people users actually talk to, because the content is easily accessible from the IM window.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 127 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2:
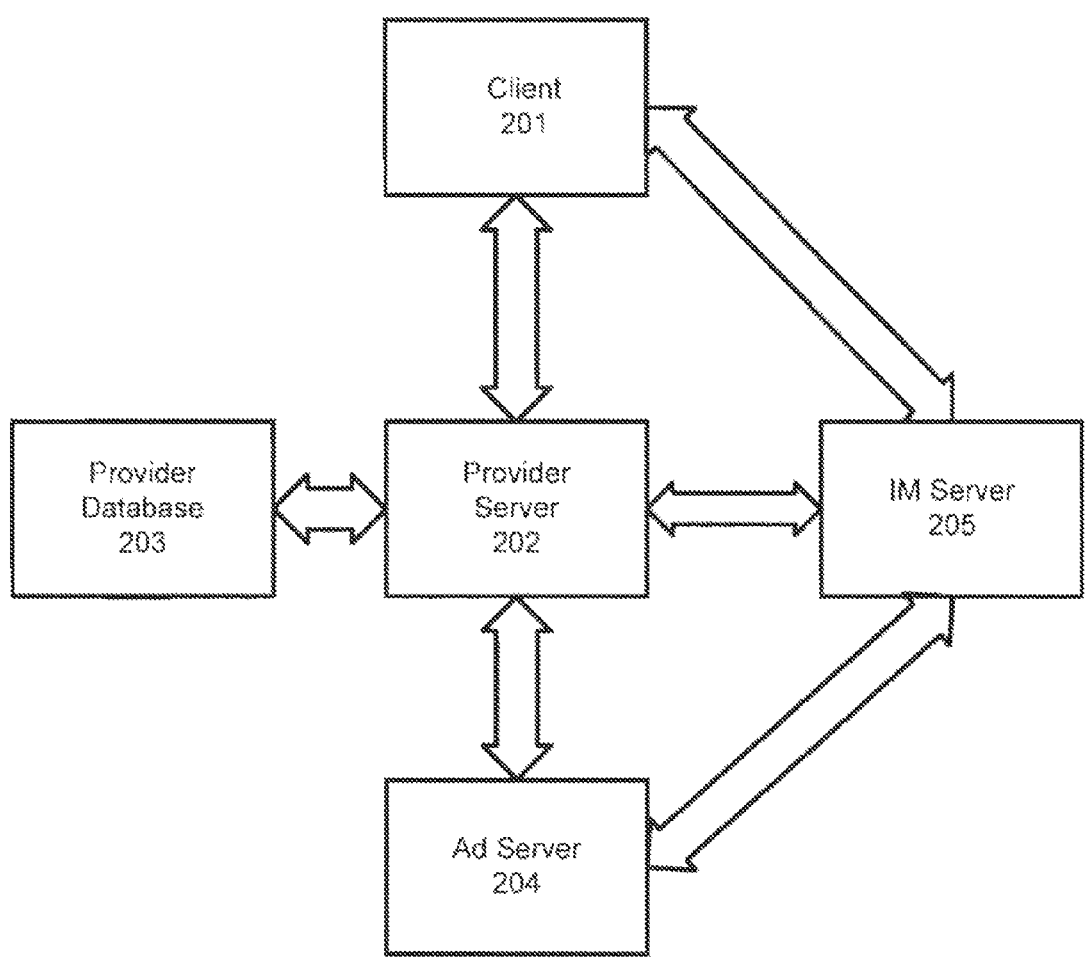
FIG. 2 illustrates a system level diagram of a system for sharing content in an instant messaging application, according to one embodiment.

FIG. 2 illustrates a system level diagram of a system for sharing content in an instant messaging application, according to one embodiment. A client system 201 is in communication with an instant messaging (IM) server 205 and a provider server 202. The provider server 202 is also in contact with the IM server 205, an advertisement (ad) server 204, and a provider database 203. The IM server 205 is also in communication with the ad server 204. A provider server 202 manages access by registered users, and user information is stored in a provider database 203. An IM server 205 provides instant messaging capabilities, and an ad server 204 provides advertisements. A client system 201 can be a user computer system.

Figure 3:
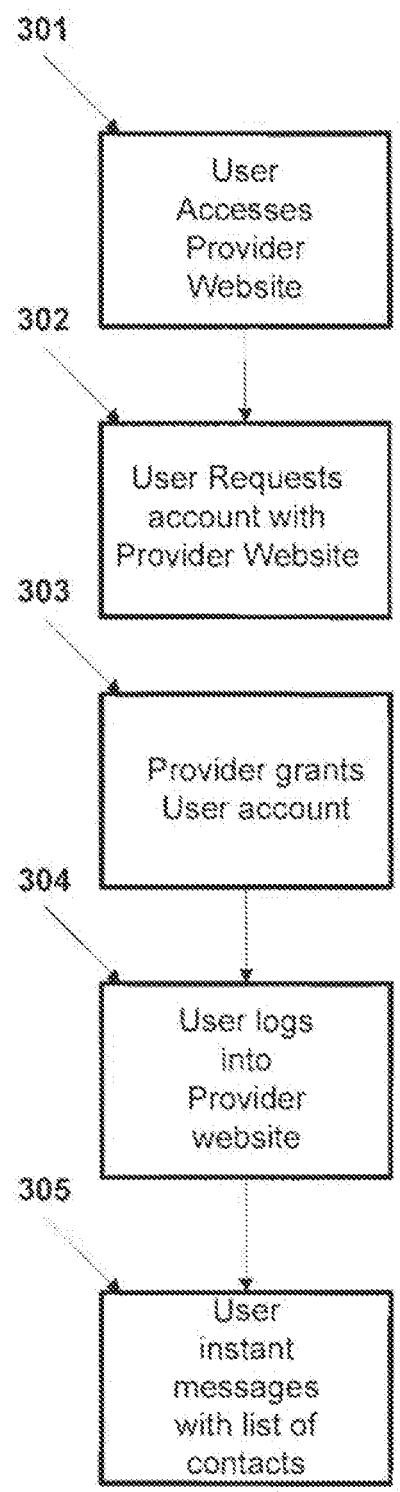
FIG. 3 illustrates a flow diagram for a registration and login process within a system for sharing content in an instant messaging application, according to one embodiment

FIG. 3 illustrates a flow diagram for a registration and login process within a system for sharing content in an instant messaging application, according to one embodiment. A user accesses a website hosted by the provider 301 and requests an account with the provider website 302. The provider authorizes/grants the user an account 303, and the user is able to log into the provider website 304 using account information agreed upon with the provider. The user can then instant message with a list of contacts 305.

Figure 4A:
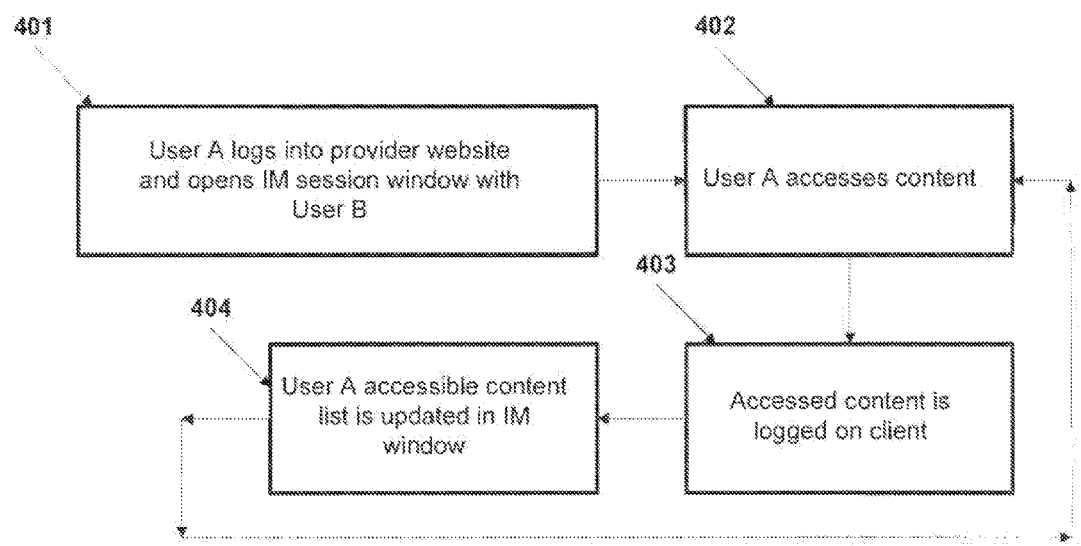
FIG. 4A illustrates a flow diagram for storing accessible content on a client within a system for sharing content in an instant messaging application, according to one embodiment.

FIG. 4A illustrates a flow diagram for storing accessible content on a client within a system for sharing content in an instant messaging application, according to one embodiment. A user A logs into the provider website and opens an IM session window with a user B 401. User A accesses content 402 and the accessed content is logged on user A's client system 403. The accessible content list for user A is updated for display in the IM window 404. User A may continue to access additional content 402 and the content will continue to be logged on the client system 403 and the list of accessible content updated 404. User A's content history can be logged indefinitely. According to one embodiment, logging of user A's content history is dependent upon storage space allocated by the client or server or a period of time designated by the provider.

Figure 4B:
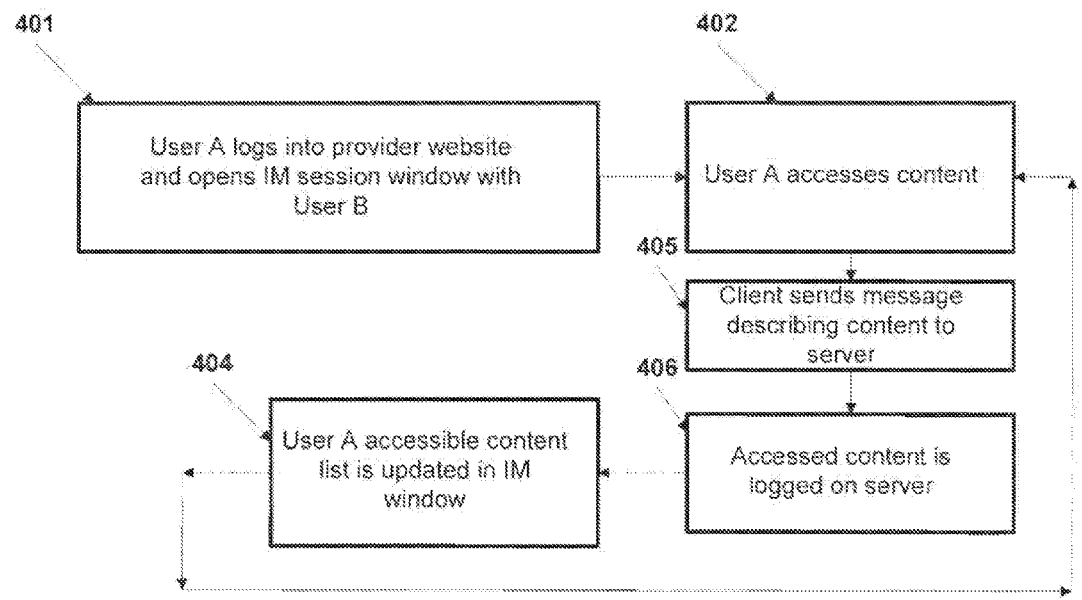
FIG. 4B illustrates a flow diagram for storing accessible content on a server within a system for sharing content in an instant messaging application, according to one embodiment.

FIG. 4B illustrates a flow diagram for storing accessible content on a server within a system for sharing content in an instant messaging application, according to one embodiment. A user A logs into the provider website and opens an IM session window with a user B 401. User A accesses content 402 and User A's client system sends a message describing the content to the server 405 so that the content can be logged on the server 406. The message describing the content to the server can include but is not limited to a user 10, a URL, an advertisement 10 (as designated by an ad server), a timestamp, and a content type. The accessible content list for User A is updated for display in the IM window 404. User A may continue to access additional content 402 and the content will continue to be communicated to 405 and stored on the server 406. The list of accessible content will continue to be updated 404. User A's content history can be logged indefinitely. According to one embodiment, logging of user A's content history is dependent upon storage space allocated by the client or server or a period of time designated by the provider.

FIG. 5 illustrates a flow diagram for sharing content within a system for sharing content in an instant messaging application, according to one embodiment. A user A logs into a provider website 501, accesses content and the content history is logged 502. As illustrated in FIGS. 4A and 4B, the content history may be logged on either the server or the client. According to one embodiment the content history is logged on both the server and the client. User A may continually access content and have it logged 502. User A opens an IM session window with a User B 503, and accesses the sharable content history by clicking on a share button 504. User A can click on an option on the sharable content list and elect to share it with User B 505. A message and URL to the sharable content are displayed to user B in an IM session window 506, and user B accesses the content by clicking on the URL 507.

FIG. 6 illustrates an exemplary user interface within a system for sharing content in an instant messaging application, according to one embodiment. An exemplary user interface 600 includes a welcome message 601 accompanied by user account information 602 displayed on a bar. Also displayed on the bar can be a user's favorite applications list 603. A buddy list 605 displays a list of a user's buddies, examples include buddy 1 606 and buddy 2 607. A chat window 604 provides chatting opportunities with buddies, and a button 608 allows a user to access a share list 609. The share list 609 includes sharable content, examples are share items 610 and 611. A content viewing prompt 602 is also a part of an exemplary user interface 600.

FIG. 7 illustrates an exemplary user interface within a system for sharing content in an instant messaging application, according to one embodiment. An exemplary user interface 700 includes a welcome message 601 accompanied by user account information 602 displayed on a bar. Also displayed on the bar can be a user's favorite applications list 603. A buddy list 605 displays a list of a user's buddies, examples include buddy 1 606 and buddy 2 607. A chat window 604 provides chatting opportunities with buddies. If a user elects to share logged content, the chat window 604 displays the name of the buddy 613 with whom the user has elected to share the content and the URL of the share item 612. A content viewing prompt 602 is also a part of an exemplary user interface 700.

FIG. 8 illustrates an exemplary user interface within a system for sharing content in an instant messaging application, according to one embodiment. An exemplary user interface 600 includes a welcome message 601 accompanied by user account information 602 displayed on a bar. Also displayed on the bar can be a user's favorite applications list 603. A buddy list 605 displays a list of a user's buddies, examples include buddy 1 606 and buddy 2 607. A chat window 604 provides chatting opportunities with buddies, and a share button or text link 801 rather than a share list. The share button 801 includes sharable content. A content viewing prompt 602 is also a part of an exemplary user interface 800.

According to one embodiment, the sharable content list includes content the user has not yet viewed. An example of sharable content a user has not yet viewed includes conversation starters. The conversation starters can be based on a user profile or designated 'favorite things.' In one embodiment, the URL to a conversation starter is not viewable by the user until the user shares the conversation starter with another user.

According to one embodiment, a user shares content with another user by using drag-and-drop functionality.

According to one embodiment, a user can edit the sharable content list. Editing the sharable content list includes but is not limited to deleting links, renaming links, reordering links, and saving links.

According to one embodiment, links in a sharable content list are colored differently if users in a particular user's buddy list have viewed the content associated with the links.

A method and system for sharing content in an instant messaging application are disclosed. It is understood that the embodiments described herein are for the purpose of elucidation and should not be considered limiting the subject matter of the present embodiments. Various modifications, uses, substitutions, recombinations, improvements, methods of productions without departing from the scope or spirit of the present invention would be evident to a person skilled in the art.

What is claimed is:

1. A computer-implemented method, comprising:
   determining a timestamp associated with accessing content using a first instant messaging application, the first instant messaging application being executable on a computer system and configured to provide a first instant messaging window;
   automatically sorting a list of recently accessed content using the first instant messaging application based on the timestamp associated with accessing the content, the sorted list of recently accessed content included for presentation in the first instant messaging window and including information describing the content;

receiving, by the first instant messaging application, a request to share a first content from the sorted list of recently accessed content included in the first instant messaging window with a second instant messaging application; and sending a message to the second instant messaging application, the message comprising a link to the first content.

2. The computer-implemented method of claim 1, further comprising:

identifying whether the link to the first content is accessed by a user of the second instant messaging application through the message; and providing a visual representation in the sorted list of recently accessed content that the link to the first content has been accessed by the user of the second instant messaging application.

3. The computer-implemented method of claim 1, further comprising determining a type of the first content being shared with the second instant messaging application.

4. The computer-implemented method of claim 1, further comprising displaying the sorted list of recently accessed content in the first instant messaging window of the first instant messaging application.

5. The computer-implemented method of claim 1, further comprising causing the message to be displayed in a second instant messaging window of the second instant messaging application.

6. The computer-implemented method of claim 1, wherein the sorted list of recently accessed content is editable using the first instant messaging application.

7. The computer-implemented method of claim 2, wherein providing the visual representation comprises highlighting the link to the first content using a different color in the sorted list of recently accessed content.

8. A system comprising:

one or more processors; and a memory storing instructions that, when executed by the one or more processors, cause the system to:

execute a first instant messaging application, the first instant messaging application being configured to provide a first instant messaging window;

determine a timestamp associated with accessing content using the first instant messaging application;

automatically sort a list of recently accessed content using the first instant messaging application based on the timestamp associated with accessing the content, the sorted list of recently accessed content included for presentation in the first instant messaging window and including information describing the content;

receive a request to share a first content from the sorted list of recently accessed content included in the first instant messaging window with a second instant messaging application; and send a message to the second instant messaging application, the message comprising a link to the first content.

9. The system of claim 8, wherein the instructions cause the system to identify whether the link to the first content is accessed by a user of the second instant messaging application through the message and provide a visual representation in the sorted list of recently accessed content that the link to the first content has been accessed by the user of the second instant messaging application.

10. The system of claim 8, wherein the instructions cause the system to determine a type of the first content being shared with the second instant messaging application.

11. The system of claim 8, wherein the instructions cause the system to display the sorted list of recently accessed content in the first instant messaging window of the first instant messaging application.

12. The system of claim 8, wherein the instructions cause the system to cause the message to be displayed in a second instant messaging window of the second instant messaging application.

13. The system of claim 8, wherein the sorted list of recently accessed content is editable using the first instant messaging application.

14. The system of claim 9, wherein to provide the visual representation comprises highlighting the link to the first content using a different color in the sorted list of recently accessed content.

15. A computer program product comprising a non-transitory computer readable medium storing a computer readable program, wherein the computer readable program when executed on a computer causes the computer to:

execute a first instant messaging application, the first instant messaging application being configured to provide a first instant messaging window;

determine a timestamp associated with accessing content using the first instant messaging application;

automatically sort a list of recently accessed content using the first instant messaging application based on the timestamp associated with accessing the content, the sorted list of recently accessed content included for presentation in the first instant messaging window and including information describing the content;

receive a request to share a first content from the sorted list of recently accessed content included in the first instant messaging window with a second instant messaging application; and send a message to the second instant messaging application, the message comprising a link to the first content.

16. The computer program product of claim 15, wherein the computer readable program causes the computer to:

identify whether the link to the first content is accessed by a user of the second instant messaging application through the message; and provide a visual representation in the sorted list of recently accessed content that the link to the first content has been accessed by the user of the second instant messaging application.

17. The computer program product of claim 15, wherein the computer readable program causes the computer to determine a type of the first content being shared with the second instant messaging application.

18. The computer program product of claim 15, wherein the computer readable program causes the computer to display the sorted list of recently accessed content in the first instant messaging window of the first instant messaging application.

19. The computer program product of claim 15, wherein the sorted list of recently accessed content is editable using the first instant messaging application.

20. The computer program product of claim 16, wherein to provide the visual representation comprises highlighting the link to the first content using a different color in the sorted list of recently accessed content.

* * * * *

UNITED STATES PATENT AND TRADEMARK OFFICE
CERTIFICATE OF CORRECTION

PATENT NO. : 9,509,644 B2  Page 1 of 1
APPLICATION NO. : 14/871536
DATED : November 29, 2016
INVENTOR(S) : Christopher Szeto It is certified that error appears in the above-identified patent and that said Letters Patent is hereby corrected as shown below:

In the Specification

In Column 2, Line 45, after "video" please insert --)--

In Column 2, Line 51, please replace "Le" with --i.e.--

Signed and Sealed this
Twenty-first Day of February, 2017

Michelle K. Lee
*Director of the United States Patent and Trademark Office*